United States Patent
Healey et al.

(10) Patent No.: US 10,667,530 B2
(45) Date of Patent: Jun. 2, 2020

(54) AUTOMATED PROCESS FOR DETERMINING AMOUNT OF MEAT REMAINING ON ANIMAL CARCASS

(71) Applicant: Cryovac, LLC, Charlotte, NC (US)

(72) Inventors: Daniel Healey, West Haven, CT (US); Rajeev Sinha, Duncan, SC (US); Lewis Webb, Boiling Springs, SC (US); Keith Johnson, Woodbury, MN (US); James Mize, Simpsonville, SC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/471,048

(22) PCT Filed: Dec. 20, 2017

(86) PCT No.: PCT/US2017/067609
§ 371 (c)(1),
(2) Date: Jun. 19, 2019

(87) PCT Pub. No.: WO2018/125715
PCT Pub. Date: Jul. 5, 2018

(65) Prior Publication Data
US 2019/0313654 A1    Oct. 17, 2019

Related U.S. Application Data

(60) Provisional application No. 62/439,626, filed on Dec. 28, 2016.

(51) Int. Cl.
*G06K 9/00*    (2006.01)
*G06K 9/46*    (2006.01)
(Continued)

(52) U.S. Cl.
CPC .............. *A22B 5/007* (2013.01); *A22C 21/00* (2013.01); *G06T 7/0014* (2013.01); *G06T 2207/10024* (2013.01); *G06T 2207/30128* (2013.01)

(58) Field of Classification Search
USPC ......... 382/110, 155, 190; 452/149; 119/174; 345/420
See application file for complete search history.

(56) References Cited

U.S. PATENT DOCUMENTS

| 4,807,163 A | 2/1989 | Gibbons |
| 5,335,293 A | 8/1994 | Vannelli et al. |

(Continued)

FOREIGN PATENT DOCUMENTS

| WO | 9808088 A1 | 2/1998 |
| WO | 0122081 A1 | 3/2001 |
| ZA | 9801324 B | 10/1999 |

*Primary Examiner* — Kathleen Y Dulaney
(74) *Attorney, Agent, or Firm* — Jon M. Isaacson

(57) ABSTRACT

An automated process assesses an amount of meat remaining on a trimmed animal carcass by generating image data of the carcass and processing the image data in a computer to calculate the amount of meat remaining on the carcass. The automated process can be carried out using an equation developed by counting pixels in an area of interest in images of a plurality of reference trimmed carcasses from which the remaining meat is thereafter scraped and weighed, to produce data points used to develop the equation which is then used to calculate the amount of meat remaining on a trimmed carcass as it proceeds down a processing line.

21 Claims, 12 Drawing Sheets

(51) Int. Cl.
    *G06K 9/62*     (2006.01)
    *A22C 18/00*     (2006.01)
    *A01K 29/00*     (2006.01)
    *G06T 17/00*     (2006.01)
    *A22B 5/00*     (2006.01)
    *A22C 21/00*     (2006.01)
    *G06T 7/00*     (2017.01)

(56) References Cited

U.S. PATENT DOCUMENTS

| | | | |
|---|---|---|---|
| 5,944,598 A * | 8/1999 | Tong | A22B 5/007 382/100 |
| 9,675,091 B1 * | 6/2017 | Eger | A22C 17/0086 |
| 2003/0024481 A1 * | 2/2003 | Kalscheur | A01K 11/006 119/174 |
| 2006/0162518 A1 * | 7/2006 | Biggs | B26D 3/28 83/75.5 |
| 2007/0275647 A1 * | 11/2007 | Eger | A22B 5/0035 452/156 |
| 2008/0204733 A1 * | 8/2008 | Jones | G01N 21/21 356/237.1 |
| 2009/0087033 A1 * | 4/2009 | Chao | G06K 9/00 382/110 |
| 2010/0105306 A1 * | 4/2010 | Daley | A22B 5/0041 452/135 |
| 2012/0295527 A1 * | 11/2012 | Hattori | A22C 17/004 452/136 |
| 2015/0150272 A1 * | 6/2015 | Peters | A22C 21/0053 452/149 |
| 2017/0196232 A1 * | 7/2017 | Vuholm | B26D 5/007 |

* cited by examiner

AUTOMATED PROCESS FOR DETERMINING AMOUNT OF MEAT REMAINING ON ANIMAL CARCASS

BACKGROUND

In the processing of meat products, including beef, pork, poultry, fish, etc, meat is removed from the animal carcass manually and/or using machinery. The machinery can be automated or manually operated. Upon completion of meat removal from the carcass, any amount of meat remaining on the carcass has a value far less than the meat removed from the carcass. For example, in the removal of turkey breast meat from the carcass, the breast meat removed with the breast muscle has a value of about ten times the value of breast meat remaining on the carcass.

Food processors seek to maximize production yields and minimize waste. Improvement initiatives have been used to identify and drive efficiency gains. For example, turkey processors track how much meat is left on the turkey "skeleton" (i.e., the turkey "frame", or "carcass") before it goes to a lower-value end use than the meat removed from the carcass. If the process of removal of meat is 100% efficient, no meat would remain on the frame, and 100% of the meat originally on the carcass would be present in the form of a high value product separated from the carcass. However, due to inefficiencies in both automated and manual processing of the turkeys, and the real-world challenge of removing all the meat from the carcass both automated machinery and human processors leave a finite amount of meat on the carcass of the animal.

In the past, the efficiency of a food processor's operation has been assessed by manually measuring how much meat is left on the carcass. This is typically done by pulling random samples of products from the processing line and measuring key attributes. For example, to measure the efficiency of a turkey processing line, a processor would want to know how much turkey breast is remaining on the turkey frame before it is discarded. It is not feasible to measure every single turkey, so smaller samples are taken to represent the entire populate of turkeys produced on a given line. To weigh the turkey breast remaining on the frame, the frame is manually scraped of all meat. The scraped meat is weighed and recorded using anything from a pen and paper to an electronic data entry system where the data can be analyzed and reported. Moreover, the results are usually reported 24 to 48 hours after the samples are pulled and scraped. It would be desirable to enhance the efficiency and degree of assessment of meat removal from animal carcasses, to more closely and accurately monitor production yield in an effort to improve production yields and minimize waste.

SUMMARY

A first aspect is directed to an automated process for determining an amount of meat remaining on an animal carcass. The process comprises: (A) generating image data with a camera, the image data being of an animal carcass after meat has been removed from at least a portion thereof; (B) transmitting the image data from the camera to a computer having machine vision software; and (C) processing the image data using the machine vision software to identify data related to meat remaining on the animal carcass; and (D) determining (e.g., via calculation) an amount of meat remaining on the animal carcass from the data identified as relating to the meat remaining on the animal carcass.

In an embodiment, the process further comprises cross-referencing the data related to meat remaining on the animal carcass with a look-up table to determine the amount of meat remaining on the animal carcass.

In an embodiment, the process further comprises detecting the presence of an animal carcass in front of the camera before the image data from the animal carcass is generated by the camera.

In an embodiment, the process further comprises processing the image data in a manner that determines the orientation of the animal carcass relative to the camera.

In an embodiment, the processing of the image data includes identification of attributes of the carcass related to the meat remaining on the animal carcass.

In an embodiment, the processing of the image data includes measurement of attributes of the carcass related to meat remaining on the carcass.

In an embodiment, the camera generates the image data as the animal carcass is in motion.

In an embodiment, the camera generates image data from one or more images of the animal carcass.

In an embodiment, the image data is processed to locate a portion of the image data correlating with a region of the animal carcass to be assessed for meat remaining on the carcass.

In an embodiment, the process further comprises: (i) identifying the image of the animal carcass as a single blob; (ii) determining the number of pixels in the image of the blob; (iii) identifying the carcass as a male carcass if the number of pixels meets or exceeds a threshold value, or identifying the carcass as a female carcass if the number of pixels is less than the threshold value.

In an embodiment, the region of the animal carcass to be assessed differs based at least in part upon whether the carcass is a male carcass or a female carcass.

In an embodiment, the carcass is a poultry carcass and the region to be assessed is a keel region of the carcass.

In an embodiment, the carcass is a poultry carcass and the region to be assessed is a scapula region of the carcass.

In an embodiment, the image data is processed by counting a number of pixels having a value within a defined value range. The value can be a color value.

In an embodiment, the image data is processed by counting a first number of pixels having a color value within a first color value range and a second number of pixels having a color value within a second color value range, with the first color value range not overlapping the second color value range.

In an embodiment, the defined color value range is predetermined and independent of the image data generated.

In an embodiment, the defined color value range is dependent upon the image data generated.

In an embodiment, the defined color value range is determined by processing the image data generated by the camera.

In an embodiment, the animal carcass comprises a member selected from the group consisting of beef carcass, pork carcass, lamb carcass, poultry carcass, and fish carcass.

In an embodiment, the animal carcass is a turkey carcass. The software can process the image data to find an area of the turkey carcass that is of interest, i.e., that portion of the turkey which will be measured for amount of meat remaining. After locating the area of interest, the software can process the image data to obtain a count of pixels having a color within a defined color value range in the area of interest. Moreover, for each defined color value range, the software measures the number of pixels in the defined area of interest and records a data set for each image that is analyzed.

For example, in a turkey breast application, the software could process the image data in each area of interest, with the data processing including counting the number of "white" pixels, the number of "red" pixels, and the number of "peach" pixels. Each color could include a defined range of colors, i.e., "red" could be defined as a very specific shade of red or a broader range of red that includes light red and dark red colored pixels.

The process includes correlation between the colored pixels counts and the weight of meat that is contained in the area of interest on the animal carcass. For example, once the color pixel counts are known, a look-up table can be utilized to determine the amount of turkey breast meat corresponding with the color pixel count, i.e., the amount of turkey breast meat remaining on the turkey carcass. The look-up table can be prepared by correlating color pixel counts in the area of interest with amount of meat scraped from the area of interest of a carcass used to generate the image providing the pixel counts. A series of such "standards" can be used to generate a relationship between color pixel counts and amount of meat remaining on the carcass. As such, any given color pixel count can be compared with the standards to determine the amount of meat remaining on the carcass provided by the image data.

In an embodiment, the image data is processed to identify image data related to turkey breast meat remaining on the turkey carcass.

In an embodiment, the image data related to turkey breast meat remaining on the animal carcass is cross-referenced with a look-up table to determine the amount of breast meat remaining on the turkey carcass.

In an embodiment, the image data generated from a two-dimensional image data is used to determine a three-dimensional metric corresponding with a weight of meat remaining on the animal carcass.

In an embodiment, the three-dimensional metric is determined from the two-dimensional image using color correlation. The processing of color intensity data from the pixels can also be used so that pixel color intensity data correlates with thickness of the meat remaining on the animal carcass.

In an embodiment, the automated process for determining an amount of meat remaining on an animal carcass is carried out on each carcass in a line of carcasses.

In an embodiment, the automated process for determining an amount of meat remaining on an animal carcass provides real-time measurement of the amount of meat remaining on the animal carcass. If unfavorable trends are observed, the issue can be addressed without delay.

A second aspect is directed to an automated process for determining an amount of meat remaining on an animal carcass, comprising (A) generating a plurality of reference images from a plurality of plurality of trimmed reference carcasses and locating an area of interest in each reference image and counting the number of pixels within a value range in each area of interest for each of the plurality of trimmed reference carcasses, followed by determining the weight of meat remaining on each of the reference carcasses; (B) developing an equation by cross-referencing pixel count within the value range with weight of meat remaining on the carcass for each of the reference carcasses; (C) generating an image of a trimmed carcass to be automatically assessed for amount of meat remaining thereon; (D) locating the area of interest in the image of the trimmed carcass to be automatically assessed; (E) counting a number of pixels in the value range in the area of interest in the trimmed carcass to be automatically assessed; and (F) processing the pixel count in the value range in the area of interest in the image of the trimmed carcass to be automatically assessed to determine the amount of meat remaining on the trimmed carcass to be automatically assessed, using the equation that cross-references pixel count with weight of meat remaining on each of the reference carcasses.

The equation is developed by plotting points, for each carcass, the points being defined by (i) the pixel count on a first axis and (ii) the weight of meat removed from the carcass, (meat is removed by scraping all the meat off the carcass, then weighing the meat) on the second axis. The resulting set of points generated by the pixel count and weight of meat from the plurality of reference carcasses is plotted as a set of reference points. The set of points is then used to define a best-fit line, which in turn defines the developed equation for cross-referencing pixel count with weight of meat.

In this manner, it has surprisingly been discovered that by taking a reflected-light image of a trimmed carcass, the amount of meat remaining on the trimmed carcass can be mathematically determined by processing the data using the developed equation, to determine with relatively high accuracy the amount of meat remaining on the carcass, without having to scrape the meat from the carcass and without having to interrupt the carcass processing line. The feedback informs the operators of the effectiveness of their trimming cuts, as the less meat remaining on the trimmed carcass, the more value produced by the trimming.

In an embodiment, the process further comprises: (i) identifying the image of each carcass as a single blob; (ii) determining the number of pixels in each blob; (iii) identifying as a male each carcass having a number of pixels meeting or exceeding a threshold value, or as a female each carcass having a number of pixels less than the threshold value.

In an embodiment, the area of interest in each image is based at least in part on whether the carcass is a male carcass or a female carcass.

In an embodiment, the carcass is a poultry carcass and the area of interest is a keel region of the carcass.

In an embodiment, the carcass is a poultry carcass and the region to be assessed is a scapula region of the carcass.

In an embodiment, images of the trimmed reference carcasses are generated solely from light reflected from the trimmed reference carcasses, and the image of the trimmed carcass to be automatically assessed is generated solely from light reflected from the trimmed carcass to be automatically assessed.

In an embodiment, the image is processed with a filter that carries out at least one member selected from the group consisting of (a) eliminating texture from the image, (b) performing a dilation of the image followed by erosion of the image, and (c) reducing or removing dark areas from the image, the processing of the image being carried out before the counting of the number of pixels in the area of interest.

In an embodiment, generating the image of the trimmed carcass to be automatically assessed for amount of meat remaining thereon is carried out with a camera, and the camera is triggered by a sensor.

In an embodiment, the process further comprises displaying the amount of meat remaining on the trimmed carcass on a stacklight controlled by a stacklight controller.

In an embodiment:
(i) the generation of the image of the trimmed carcass to be automatically assessed for amount of meat remaining thereon,
(ii) the locating of the area of interest in the image of the trimmed carcass to be automatically assessed,
(iii) the counting of the number of pixels in the value range in the area of interest in the trimmed carcass to be automatically assessed, and
(iv) the processing of the pixel count in the value range in the area of interest in the image of the trimmed carcass to be automatically assessed to determine the amount of meat remaining on the trimmed carcass to be automatically assessed, using the equation that cross-references pixel count within the value range with weight of meat remaining on each of the reference carcasses, are all carried out in a carcass processing line with the trimmed carcass to be automatically assessed being one in a series of trimmed carcasses to be automatically assessed, said carcasses proceeding down the carcass processing line without being removed from the processing line, as process steps (i), (ii), (iii), and (iv) are being carried out.

In an embodiment, the process further comprises displaying the amount of meat remaining on the trimmed carcass on a monitor inside a carcass processing plant.

In an embodiment, the automated process is carried out on a plurality of carcasses proceeding down a carcass processing line, resulting in a plurality of determinations of the amount of meat remaining on the plurality of trimmed carcasses, with the plurality of determinations of amount of meat being stored and averaged, with the average amount of meat remaining on the carcass being displayed.

In an embodiment: (i) the generating of the image of the trimmed carcass to be automatically assessed includes generating of a first image of a left side of the trimmed carcass and generating of a second image of a right side of the trimmed carcass; (ii) the locating of the area of interest in the image of the trimmed carcass to be automatically assessed includes locating a first area of interest in the left side of the trimmed carcass to be automatically assessed, and locating a second area of interest in the right side of the trimmed carcass to be automatically assessed; (iii) the counting of the number of pixels in the value range in the area of interest in the trimmed carcass to be automatically assessed includes counting the number of pixels in the first area of interest in the image of the left side of the trimmed carcass to be automatically assessed, and counting the number of pixels in the second area of interest in the image of the right side of the trimmed carcass to be automatically assessed; and (iv) the processing of the pixel count in the value range in the area of interest in the image of the trimmed carcass to be automatically assessed to determine the amount of meat remaining on the trimmed carcass to be automatically assessed, using the equation that cross-references pixel count within the value range with weight of meat remaining on each of the reference carcasses, is conducted for both the left side of the trimmed carcass and the right side of the trimmed carcass.

In an embodiment, the generating of the first image of the left side of the trimmed carcass is carried out with a first camera mounted on a first side of a carcass processing line, and the generating of the second image of the right side of the trimmed carcass is carried out with a second camera mounted on a second side of the carcass processing line.

In an embodiment, the trimmed carcasses are all of a single type selected from the group consisting of chicken carcass, turkey carcass, beef carcass, pork carcass, and lamb carcass.

In an embodiment, the process is carried out on a chicken processing line comprising a plurality of the trimmed chicken carcasses to be automatically assessed for amount of meat remaining on the carcass, the process further comprising: (A) forwarding the plurality of trimmed chicken carcasses to be automatically assessed, each trimmed chicken carcass being mounted on a cone support, each of the trimmed chicken carcasses to be automatically assessed comprising a protruding breastbone, (B) passing each mounted trimmed chicken carcass to be automatically assessed through a carcass orientation device comprising a pair of inwardly biased carcass contact members that allow passage of the mounted, trimmed chicken carcasses therebetween in a manner so that at least 95 percent of the trimmed chicken carcasses are placed in a breastbone-upstream orientation after passing through the orientation device; (C) generating a first image of a left side of the trimmed carcass with a first camera mounted on a first side of the chicken processing line, and generating a second image of a right side of the trimmed carcass with a second camera mounted on a second side of the chicken line; (D) locating a first area of interest in the first image of the left side of each of the trimmed carcasses to be automatically assessed, and locating a second area of interest in the second image of the right side of each of the trimmed carcasses to be automatically assessed; (E) counting the number of pixels in the value range in the first area of interest of the first image of the left side of each of the trimmed carcasses to be automatically assessed, and counting the number of pixels in the value range in the second area of interest of the second image of the right side of each of the trimmed carcasses to be automatically assessed; and (F) processing the pixel count in the value range in the first area of interest in the first image of the left side of each of the trimmed carcasses to be automatically assessed to determine the amount of meat remaining on the left side of each of the trimmed carcasses to be automatically assessed, and processing the pixel count in the value range in the second area of interest in the second image of the right side of each of the trimmed carcasses to be automatically assessed to determine the amount of meat remaining on the right side of the trimmed carcass to be automatically assessed. In a further embodiment, the process further comprises (G) triggering the first camera with a first sensor which senses when the trimmed carcass is in the field of view of the first camera, and triggering the second camera with a second sensor which senses when the trimmed carcass is in the field of view of the second camera; (H) determining the amount of meat remaining on the trimmed carcass for a plurality of trimmed carcasses, and averaging the amounts of meat for the plurality of trimmed carcasses to determine an average amount of meat remaining on the carcasses; and (I) displaying the average amount of meat remaining on the carcasses on a stacklight, and controlling the stacklight with a stacklight controller. In a yet further embodiment, the process further comprises (J) displaying the average amount of meat remaining on the carcasses on a monitor inside a carcass processing plant.

In an embodiment, the automated process is carried out on a turkey processing line comprising a plurality of trimmed turkey carcasses to be automatically assessed for amount of meat remaining on the carcass, with the process further comprising: (A) forwarding the plurality of trimmed turkey carcasses to be automatically assessed, each of the trimmed turkey carcasses having an extending breastbone portion, with each of the trimmed turkey carcasses being mounted on a non-rotating clamp with the breastbone oriented either upstream or downstream relative to direction of line travel so that a right side of each carcass is visible from one side of the processing line and a left side of each carcass is visible from the other side of the processing line; (B) generating a first image of a left side of the trimmed carcass with a first camera mounted on a first side of the turkey processing line, and generating a second image of a right side of the trimmed carcass with a second camera mounted on a second side of the turkey processing line; (C) locating a first area of interest in the first image of the left side of each trimmed carcass to be automatically assessed, and locating a second area of interest in the second image of the right side of each trimmed carcass to be automatically assessed; (D) counting of the number of pixels in the value range in the first area of interest of the first image of the left side of the trimmed carcass to be automatically assessed, and counting the number of pixels in the value range in the second area of interest of the second image of the right side of the trimmed carcass to be automatically assessed; and (E) processing of the pixel count in the value range in the first area of interest in the first image of the left side of the trimmed carcass to be automatically assessed to determine the amount of meat remaining on the left side of the trimmed carcass to be automatically assessed, and processing the pixel count in the value range in the second area of interest in the second image of the right side of the trimmed carcass to be automatically assessed to determine the amount of meat remaining on the right side of the trimmed carcass to be automatically assessed. In a further embodiment, the process further comprises: (F) triggering the first camera with a first sensor which senses when the trimmed carcass is in the field of view of the first camera, and triggering the second camera with a second sensor which senses when the trimmed carcass is in the field of view of the second camera; (G) determining the amount of meat remaining on the trimmed carcass for a plurality of trimmed carcasses, and averaging the amounts of meat for the plurality of trimmed carcasses to determine an average amount of meat remaining on the carcasses; and (H) displaying the average amount of meat remaining on the carcasses on a stacklight, and controlling the stacklight with a stacklight controller. A yet further embodiment further comprises (I) displaying the average amount of meat remaining on the carcasses on a monitor inside a carcass processing plant. In a still yet further embodiment, the process comprises (J) locating at least two areas of interest in at least one of the first image and the second image; (K) counting a number of pixels in the value range in each of the two areas of interest; and (L) processing the pixel count in the value range in each of the two areas of interest to determine the amount of meat remaining on the trimmed carcass.

In an embodiment, the process is carried out on a trimmed carcass of a type selected from the group consisting of beef, pork, and lamb, wherein the trimmed carcass is positioned on a conveyor and the image is generated by a camera positioned directly above the conveyor. In a further embodiment, the trimmed carcass is selected from the group consisting of trimmed neck carcass and trimmed pelvis carcass.

DETAILED DESCRIPTION

As used herein, the terms "camera" and "computer" are inclusive of both discrete a camera in combination with discrete and separate computer, as well as cameras having built-in computers. That is, there are commercially-available cameras having onboard processors capable of processing the images without the need for a separate computer. The term "camera" is used interchangeably with the phrase "image generator."

The term "carcass," and the phrase "animal carcass," as used herein refer to a portion of an animal which remains after the animal has been killed and at least partially cut up for food, including at least a portion of the skeletal frame of the animal. Usually the animal is eviscerated before it is cut up.

As used herein, the phrase "keel region" refers to the keel bone portion of a poultry carcass, and any meat remaining thereon after the breast meat has been removed during trimming of meat from the carcass.

As used herein, the phrase "scapula region" refers to the scapula bone portion of a poultry carcass, and any meat remaining thereon after the scapula meat has been removed therefrom.

As used herein, the phrases "identifying the carcass as a male carcass" refers to taking a measurement and thereafter considering the carcass to be a male carcass if the number of pixels meets or exceeds a threshold value, regardless of the actual gender of the carcass.

As used herein, the phrases "identifying the carcass as a female carcass" refers to taking a measurement and thereafter considering the carcass to be a female carcass if the number of pixels is less than a threshold value, regardless of the actual gender of the carcass.

Figure 1:
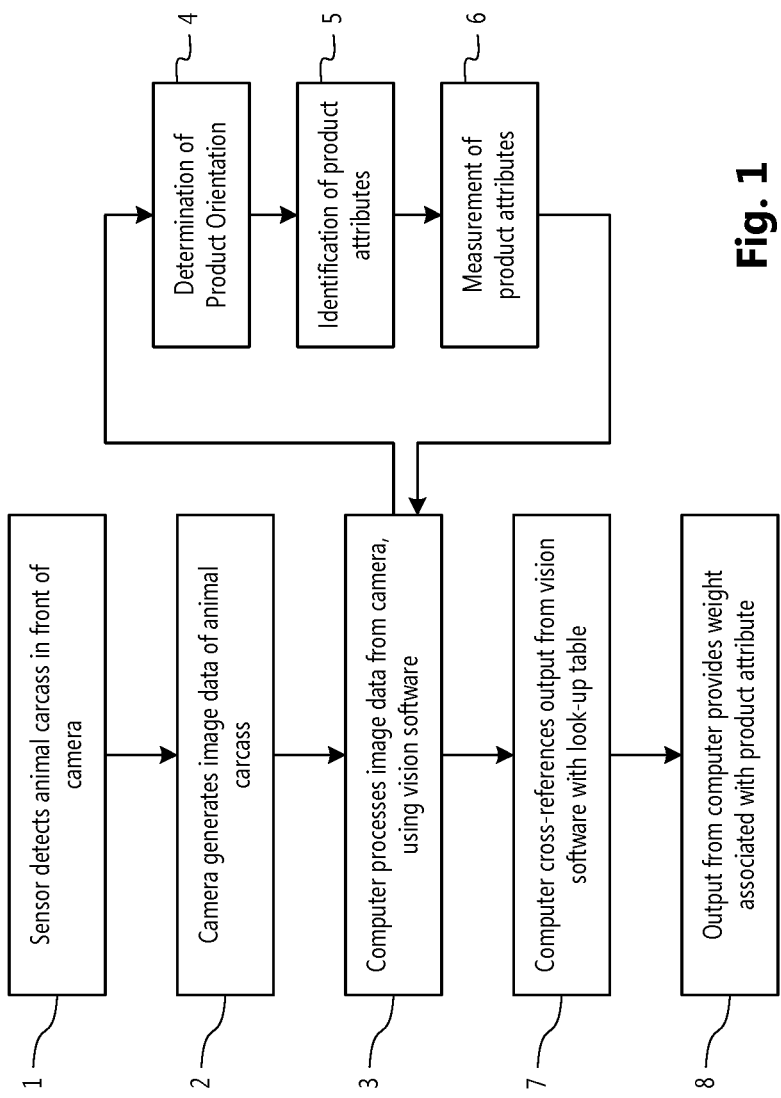
FIG. 1 illustrates a flow diagram of a first embodiment of an automated process for determining amount of meat remaining on trimmed animal carcass.

FIG. 1 is a schematic flow diagram for carrying out an embodiment of the process of the invention. Sensor 1 detects an animal carcass in front of camera 2. The animal carcass has had meat removed from at least a portion thereof. Camera 2 generates image data of the animal carcass. Image data from camera 2 is then fed into computer 3, which has vision software installed therein and which processes the image data. Computer 3 having vision software is used to 4 determine product orientation, 5 identify product attributes (e.g., identification of one or more areas of interest in the image data, determine pixel colors in the area(s) of interest, etc), and 6 measure product attributes, e.g., determine counts of pixel colors in the area(s) of interest. The output from the vision software, i.e., the measured product attributes, are then 7 cross-referenced with a look-up table to determine the amount of meat on the carcass corresponding to the pixel colors and pixel counts. The cross-referenced output from the computer then 8 provides the weight of meat associated with the product attributes determined from the image data.

Figure 2:
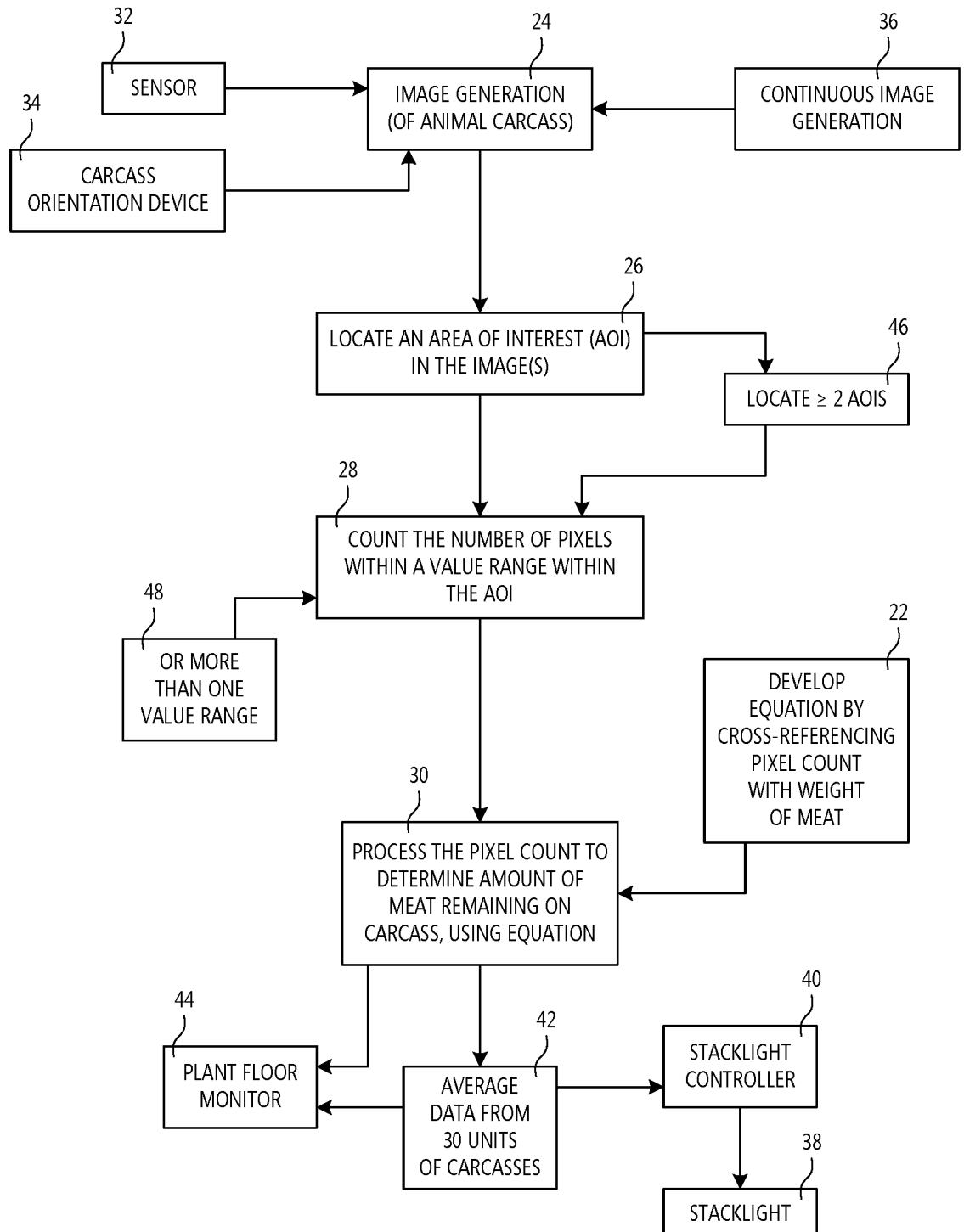
FIG. 2 illustrates a flow diagram of a second embodiment of an automated process for determining amount of meat remaining on trimmed animal carcass.

FIG. 2 is a schematic flow diagram of alternative process 20. The numbered boxes in the flow diagram can be referred to as process steps. Some of the numbered boxes in the flow diagram can alternatively be referred to as equipment. A basic process in the flow diagram of FIG. 2 is as follows:

First Step 22: developing an equation by cross-referencing pixel count with weight of meat;

Second Step 24: generation of at least one image of the trimmed animal carcass to be automatically assessed for amount of meat remaining thereon;

Third Step 26: locating at least one area of interest (AOI) in the image(s) from the first step;

Fourth Step 28: counting the number of pixels within a value range within the AOI;

Fifth Step 30: processing the pixel count to determine amount of meat remaining on carcass, using the equation.

Second step 24, i.e., generating at least one image of the trimmed animal carcass, can be initiated by manually triggering a camera, thereby avoiding the need for automated camera triggering. However, in a preferred process the triggering is carried out automatically, either by: (i) using a sensor 32 to determine when the carcass is in a position to obtain an image suitable for automated determination of amount of meat remaining on carcass, the sensor 32 being used to time the triggering of the image generator (camera) to generate an image of the trimmed animal carcass while the trimmed carcass is in the position to obtain the image suitable for determination of amount of meat remaining on carcass as the carcass proceeds down a processing line, and/or (ii) using a carcass orientation device 34 to orient the trimmed carcass before the carcass proceeds into a zone in which the image is generated. Orientation device 34 can be combined with sensor 32 so that upon passage through orientation device 34, the movement of orientation device 34 can be designed to control the timing of the camera to capture an image of the trimmed animal carcass while the carcass is in a position (and in a controlled orientation) to achieve an image suitable for determination of amount of meat remaining on carcass as the carcass proceeds down the processing line, or (iii) providing a means for continuous generation 36 of images of the trimmed carcass by the camera as the carcasses progress down the processing line with each trimmed carcass passing through an image generation zone. In the absence of a means for continuous image production 36, sensor 32 can be used alone to trigger the timing of image generation 24, and/or carcass orientation device 34 can be used alone or in combination with sensor 32 or with continuous image production 36 to trigger the timing of the image generation 24.

The use of continuous image generation 36 eliminates the need to use sensor 32 and/or orientation device 34 to trigger the camera for image generation 24. If the continuous image generation is carried out continuously at short intervals (e.g., every 0.016 second or every 0.1 second or every 0.2 second or every 0.3 second or every 0.4 second or every 0.5 second or every 0.6 second or every 0.7 second or every 0.8 second or every 0.9 second or every 1.0 second or every 1.5 seconds or every 2 seconds or every 3 seconds or every 4 seconds or every 5 seconds or every 7 seconds or every 10 seconds or every 15 seconds or every 20 seconds or every 30 seconds or every 60 seconds, depending upon the speed of movement of the trimmed carcass, and the size of the field of view of the camera), enough images of each trimmed carcass can be made to ensure that at least one of the images is suitable for determination of amount of meat remaining on carcass.

Upon the generation of an image suitable for determination of amount of meat remaining on trimmed carcass (24), the image is processed to locate at least one AOI (26). The AOI is an area to be assessed for the amount of meat remaining on the carcass. The AOI corresponds with an area of the carcass from which meat has been trimmed. The amount of meat remaining in the AOI is inversely related to the quality of the trimming of the meat from that area of the carcass. That is, the greater the amount of meat remaining on the AOI, the lower the quality of the trimming of the meat from the AOI.

Upon locating the AOI (26), the AOI is evaluated by counting the number of pixels (i.e., pixels within the AOI) that are within a predetermined value range (28), i.e., from $\lambda_1$ to $\lambda_2$, where $\lambda$ represents wavelength. The value range can be entirely within the visible spectrum, or partially within the visible spectrum and partially outside the visible spectrum, or entirely outside the visible spectrum. The counting of the number of pixels within the value range results in a pixel count for the AOI. This pixel count is thereafter processed to determine the amount of meat remaining on the carcass 30 in the AOI.

The counting of the number of pixels can be aided by the use of a "Close" filter in the image processing before the pixels are counted. The use of a close filter eliminates texture from the image, performs a dilation of the image followed by erosion of the image, and reduces or completely removes dark areas from the image. A closed filter is exemplified by the Cognex In-Sight Explorer image processing software. It has been found that the use of the close filter improves the correlation of predictability of the assessment of amount of meat remaining on the carcass and the actual amount of meat remaining on the carcass.

The processing of the pixel count is performed by developing an equation 22 cross-referencing (a) pixel count in the value range within the AOI with (b) weight of meat remaining on the carcass in the AOI. The equation (22) cross-referencing the pixel count in the AOI with the weight of meat remaining on the carcass in the AOI is developed using "standards," i.e., trimmed carcasses which had images generated with AOIs located and numbers of pixels within at least one value range counted following which the carcass was scraped c of meat in the AOI with the scraped meat weighed. Pixel count was processed to (i.e., correlated with)

weight of remaining meat via a set of standards used to develop an equation by cross-referencing pixel count with weight of meat (22).

Once the amount of meat (e.g., weight of meat) is determined (30) by processing the pixel count using the developed equation (22), the amount-of-meat result can be stored in any desired location for use at a later time or, as is preferred, made available (i.e., "published") in one or more forms. A first form of publishing the information is via the use of a stacklight (38) which can use multiple lights (e.g., as arranged and used in a stoplight) of different color (e.g., red for unacceptably large amount of meat remaining, yellow for marginally acceptable amount of meat remaining, and green for low amount of meat remaining) or a stacklight of the same color with light position indicating performance level, e.g., with lowermost light lit in a vertical configuration indicating large amount of meat remaining on carcass (unacceptable performance of meat removal from carcass), and uppermost light lit indicating small amount of meat remaining on carcass (excellent performance of meat removal from carcass), with intermediate lights in the stack indicating by their position relative levels of intermediate performance of meat removal from carcass.

Stacklight 38 can be controlled by stacklight controller 40. Input is supplied to stacklight controller 40 from the device (e.g., computer) that processes the pixel count by applying the cross-referencing equation to determine the amount of meat remaining on the carcass. Having the stacklight within view of the meat trimmers on the processing line can provide immediate performance feedback that can produce improved trimming performance.

An alternative (or additional) means of publishing can be carried out by sending a signal from the computer processing the pixel count to determine the amount of meat remaining on carcass 30 to plant floor monitor 44, so that the statistics pertaining to the amount of meat remaining on the carcass are available to the workers and management on the plant floor. This publication can also produce improved trimming performance.

Stacklight 38 and/or stacklight controller 40 and/or plant floor monitor 40 can display the amount of meat remaining on a single trimmed carcass, or a total amount of meat remaining on a plurality of carcasses, or (42): an average amount of meat remaining on a plurality of a plurality of carcasses, e.g., 30 carcasses.

The process entails counting in the AOI the number of pixels within a value range 28. However, the process can be carried out by counting the number of pixels within a given value range for more than one AOI 46, or counting the number of pixels within at least two value ranges 48 for either a single AOI or for at least two AOIs. If two or more AOIs are located with pixel counts made within each AOI, the AOIs may be different areas of the same trim cut, or may be different trim cuts. Alternatively, a single AOI can be inclusive of multiple cuts by a single operator or a group of operators.

FIG. 2 and the above description includes the following process steps:

- 22: developing equation by cross-referencing pixel count with weight of meat
- 24: image generation (of animal carcass)
- 26: locating at least one AOI in the image
- 28: counting the number of pixels with a value range within the AOI
- 30: processing pixel count to determine amount of meat on carcass, using equation
- 32: using sensor to trigger image generation when carcass is in position for evaluation
- 34: using carcass orientation device to orient carcass into position for evaluation
- 36: using means for continuous image generation to eliminate need for sensor
- 38: publishing result in stacklight
- 40: controlling stacklight with stacklight controller
- 42: averaging amount of meat remaining from a plurality of carcasses (e.g., 30 carcasses)
- 44: publishing amount of meat remaining on plant floor monitor
- 46: locating at least two areas of interest,
- 48: counting the number of pixels in more than one value range Although some of the process steps are considered essential and other process steps considered optional, the following combinations of process steps are envisioned:

Combination #1=22+24+26+28+30
Combination #2=22+24+26+28+30+32
Combination #3=22+24+26+28+30+34
Combination #4=22+24+26+28+30+32+34
Combination #5=22+24+26+28+30+32+34
Combination #6=22+24+26+28+30+34+36
Combination #7=22+24+26+28+30+38+40
Combination #8=22+24+26+28+30+42
Combination #9=22+24+26+28+30+44
Combination #10=22+24+26+28+30+42+44
Combination #11=22+24+26+28+30+38+40+42
Combination #12=22+24+26+28+30+38+40+42+44
Combination #12: combine combination #2+combination #7 (no duplicates)
Combination #11: combine combination #2+combination #8 (no duplicates)
Combination #12: combine combination #2+combination #9 (no duplicates)
Combination #13: combine combination #2+combination #10 (no duplicates)
Combination #14: combine combination #2+combination #11 (no duplicates)
Combination #15: combine combination #2+combination #12 (no duplicates)
Combination #16: combine combination #3+combination #7 (no duplicates)
Combination #17: combine combination #3+combination #8 (no duplicates)
Combination #18: combine combination #3+combination #9 (no duplicates)
Combination #19: combine combination #3+combination #10 (no duplicates)
Combination #20: combine combination #3+combination #11 (no duplicates)
Combination #21: combine combination #3+combination #12 (no duplicates)
Combination #22: combine combination #4+combination #7 (no duplicates)
Combination #23: combine combination #3+combination #8 (no duplicates)
Combination #24: combine combination #3+combination #9 (no duplicates)
Combination #25: combine combination #3+combination #10 (no duplicates)
Combination #26: combine combination #3+combination #11 (no duplicates)
Combination #27: combine combination #3+combination #12 (no duplicates)

Combination #28: combine combination #4+combination #7 (no duplicates)
Combination #29: combine combination #4+combination #8 (no duplicates)
Combination #30: combine combination #4+combination #9 (no duplicates)
Combination #31: combine combination #4+combination #10 (no duplicates)
Combination #32: combine combination #4+combination #11 (no duplicates)
Combination #33: combine combination #4+combination #12 (no duplicates)
Combination #34: combine combination #5+combination #7 (no duplicates)
Combination #35: combine combination #5+combination #8 (no duplicates)
Combination #36: combine combination #5+combination #9 (no duplicates)
Combination #37: combine combination #5+combination #10 (no duplicates)
Combination #38: combine combination #5+combination #11 (no duplicates)
Combination #39: combine combination #5+combination #12 (no duplicates)
Combination #40: combine combination #6+combination #7 (no duplicates)
Combination #41: combine combination #6+combination #8 (no duplicates)
Combination #42: combine combination #6+combination #9 (no duplicates)
Combination #43: combine combination #6+combination #10 (no duplicates)
Combination #44: combine combination #6+combination #11 (no duplicates)
Combination #45: combine combination #6+combination #12 (no duplicates)
Combination #46: combine combination #7+combination #7 (no duplicates)
Combination #47: combine combination #7+combination #8 (no duplicates)
Combination #48: combine combination #7+combination #9 (no duplicates)
Combination #49: combine combination #7+combination #10 (no duplicates)
Combination #50: combine combination #7+combination #11 (no duplicates)
Combination #51: combine combination #7+combination #12 (no duplicates)
Combinations #52-#102: Any one of Combination #1 through #51, +#46 (no duplicates)
Combinations #103-#204: Any one of Combination #1 through #102, +#48 (no duplicates)

Figure 3A:
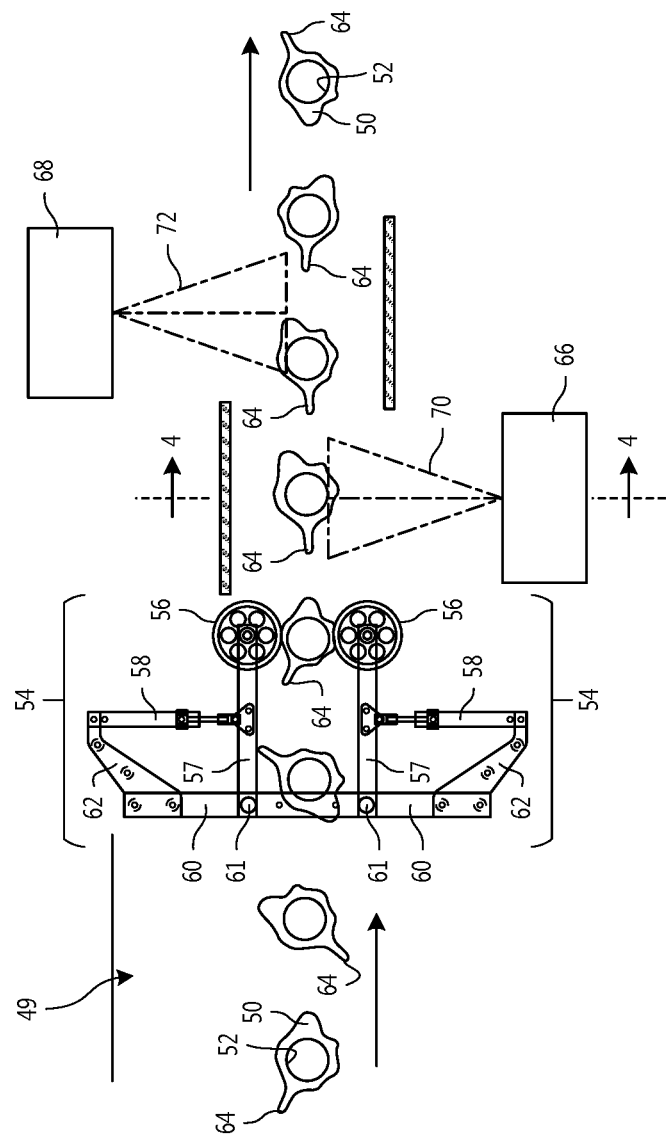
FIG. 3A is an overhead view of a portion of the process including uniform orientation of trimmed chicken carcasses mounted on cones, together with a plurality of cameras for generating an image of a side of the aligned trimmed chicken carcass.

FIG. 3A is a schematic view looking down on a portion of a chicken processing line 49 in which a plurality of trimmed chicken carcasses 50 are mounted on a corresponding plurality of cones 52. In some embodiments, the cones are rotatable relative to the shaft on which they are supported, so that the carcass and cone rotate together. In other embodiments, the cones are not rotatable, but the carcass is rotatable relative to the cone. [See FIG. 5 for a side view of cone 52 on a chicken processing line.] Cones 52 have a longitudinal axis positioned vertically, with the smaller end of cone 52 oriented upward. Cones 52 each have a support structure (not illustrated) affixed to a powered moving conveyor which is forwarded from left to right (see arrows) in FIG. 3A. Cones 52 with trimmed chicken carcasses 50 thereon pass through orientation device 54 comprising two rotatable carcass-contact rollers 56. Each carcass-contact roller 56 is mounted at the end of its own pivot arm 57. Pivot arms 57 pivot relative to base member 60 via pivot pins 61 connecting pivot arms 57 to base member 60. Each carcass-contact roller 56 is rotatable relative to the pivot arm 57 on which it is mounted. Carcass-contact rollers 56 on pivot arms 57 are biased toward one another by spring loaded pistons 58 (alternatively, gas-charged or pneumatic or hydraulic pistons can be used) each of which is mounted between piston fixed mounting arm 62 and pivot arm 57.

Figure 3B:
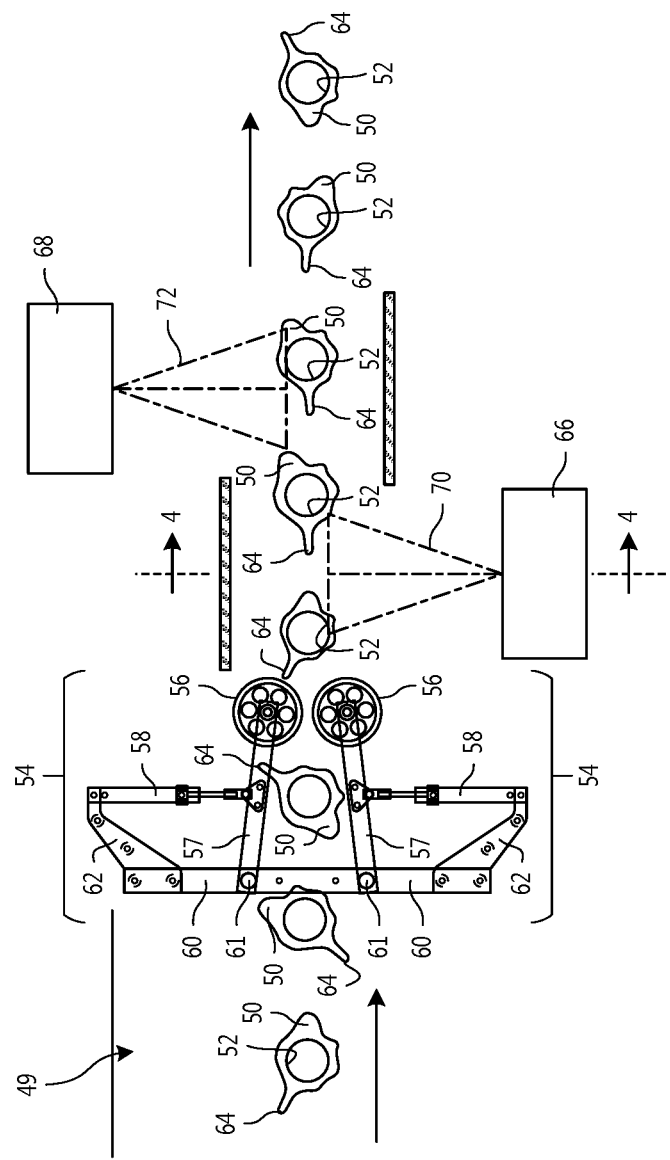
FIG. 3B is an overhead view of the same portion of the process illustrated in FIG. 3A, but with the carcasses in a different position relative to the carcass alignment device.

In FIG. 3A, as cones 52 with trimmed chicken carcasses 50 move from left to right, prior to passing through orientation device 54 the trimmed carcasses are in more or less random orientation relative to the direction of line movement. Each trimmed chicken carcass has breast bone portion 64 protruding radially outward thereof. As trimmed chicken carcasses 50 on cones 52 approach and contact inwardly-biased carcass-contact rollers 56 of orientation device 54 which are relatively close to one another (e.g., about ½ inch apart from one another), over 95% of the time the breast bone portion of the chicken carcass will not be oriented directly between the gap between the carcass-contact rollers 56. As the chicken carcass passes between rollers 56, the rollers are forced to spread apart from the force of the forwarded carcass 50 secured to cone 52. However, when the protruding breast bone portion 64 contacts a roller 56, it causes the carcass 50 (and cone 52, if the cones are rotatable relative to their mounting shaft) to rotate so that breast bone portion 64 is the last portion of the carcass to pass between the rollers. This is illustrated in FIG. 3B, in which chicken carcass 50 is in its last portion of its passageway between rollers 56, i.e., with breast bone 64 oriented upstream. This rotation orients each carcass in a sideways position with each carcass 50 in the same orientation.

Figure 3C:
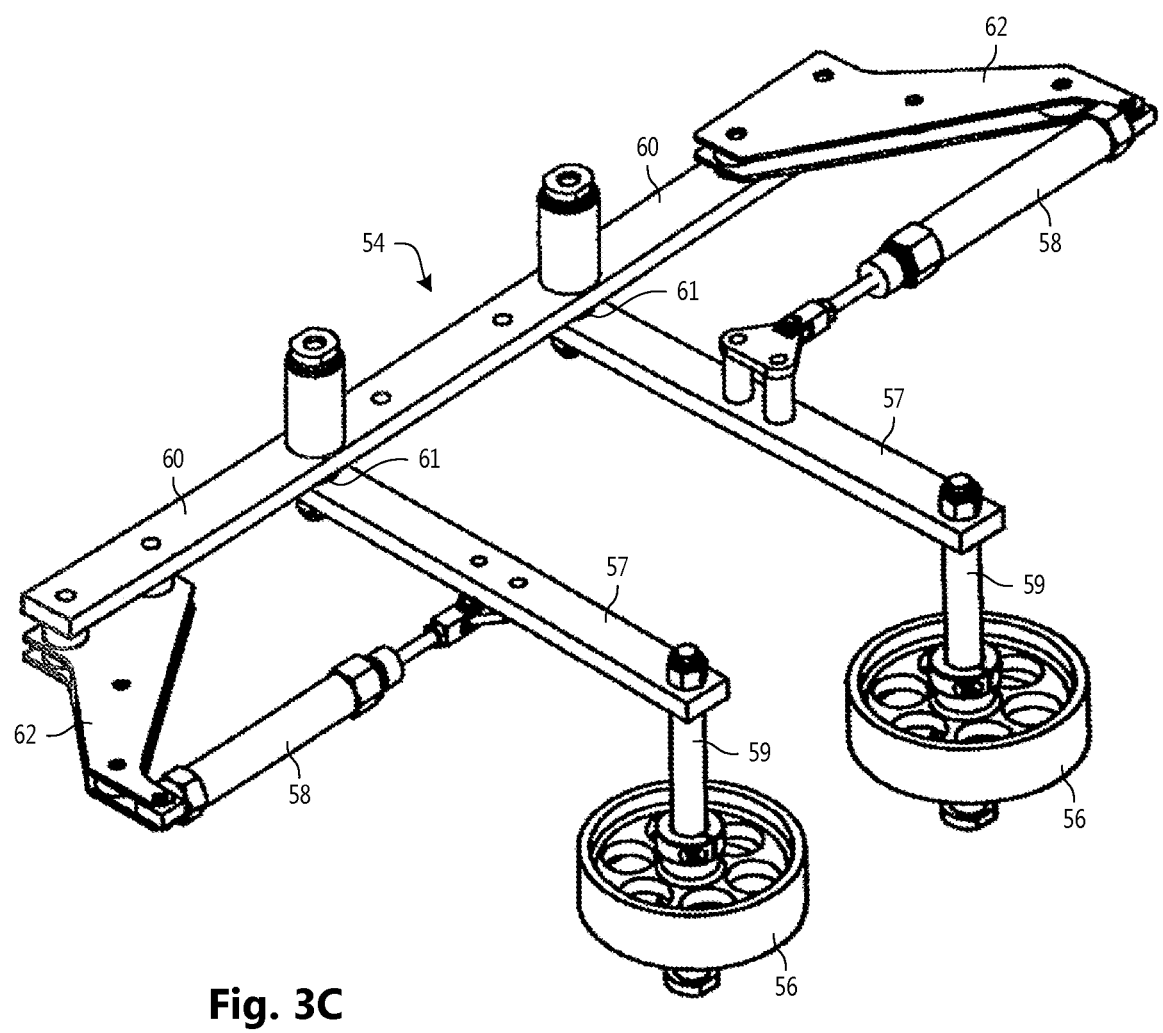
FIG. 3C is a detailed perspective view of the carcass alignment device.

FIG. 3C is a perspective view of alignment device 54, illustrating base member 60, piston fixed mounting arms 62, pivot arms 57, carcass-contacting rollers 56, and pivot pins 61. Alignment device 54 is mounted above the line by support means not illustrated. Carcass-contacting rollers 56 hang from the free end of pivot arms 57 by hang shafts 59, with rollers 56 being rotatable relative to hang shafts 59.

The breast-bone upstream orientation generated by the orientation device 54 allows the cameras within each of camera boxes 66 and 67 placed along each side of processing line to generate images suitable for determination of amount of meat remaining on carcass. The image taken by the camera within camera box 66 is an image of the left-hand side of the trimmed carcass, and the image taken by the camera within camera box 68 is an image of the right-hand side of the trimmed carcass. These side images of the trimmed carcass 50 are the images most suitable for automated determination of amount of meat remaining on the trimmed carcass 50.

As is apparent from the orientation of trimmed carcasses 50 downstream of orientation device 54 in FIG. 3A and FIG. 3B, all trimmed carcasses have the same sideways orientation relative to the camera within each of camera boxes 66 and 68. The generation of the images of the left-hand side image of trimmed carcasses 50 by the camera within camera box 66 is timed while the carcass is centered in field of view 70 of camera in camera box 66. As can be seen in FIG. 3A, trimmed chicken carcass 50 is centered in field of view 70 of the camera within camera box 66 while the cone 52 holding the next upstream trimmed chicken carcass 50 is centered between the carcass-contacting rollers 56. The timing of the image generation by the camera within camera box 66 can be controlled by a sensor (beam breaking, visual, mechanical, etc., not illustrated) which detects when a trimmed carcass 50 is centered in field of view 70 of the camera within camera box 66. In the same manner, a sensor can be used to time the image generation by a camera within camera box 68, which camera generates an image of the right-hand side of the trimmed carcass 50 when carcass 50 is centered in the field of view 72 of the camera within camera box 68.

Figure 4:
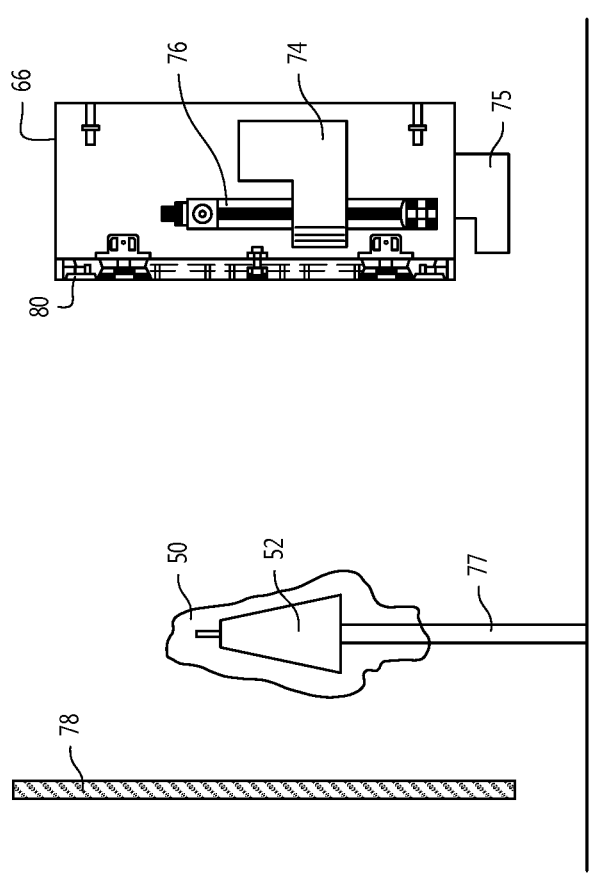
FIG. 4 is a cross-sectional view taken through section 4-4 of FIG. 3A.

FIG. 4 is a side view taken through section 4-4 of FIG. 3A. In FIG. 4, camera box 66 has camera 74 and light 76 mounted therein, with the lens of camera 74 directed through hinged door 80, which can be made from polycarbonate or other transparent material. Camera 74 is pointed at the right-hand side of oriented trimmed chicken carcass 52 mounted on cone 50. Black camera backdrop 78 fills the image background, eliminating any background imagery to affect the generation of an image suitable for determination of amount of meat remaining on carcass. Cone 52 is supported by post 77, with sensor 75 triggering camera 74 to generate an image when sensor 75 detects the presence of post 77.

Figure 5:
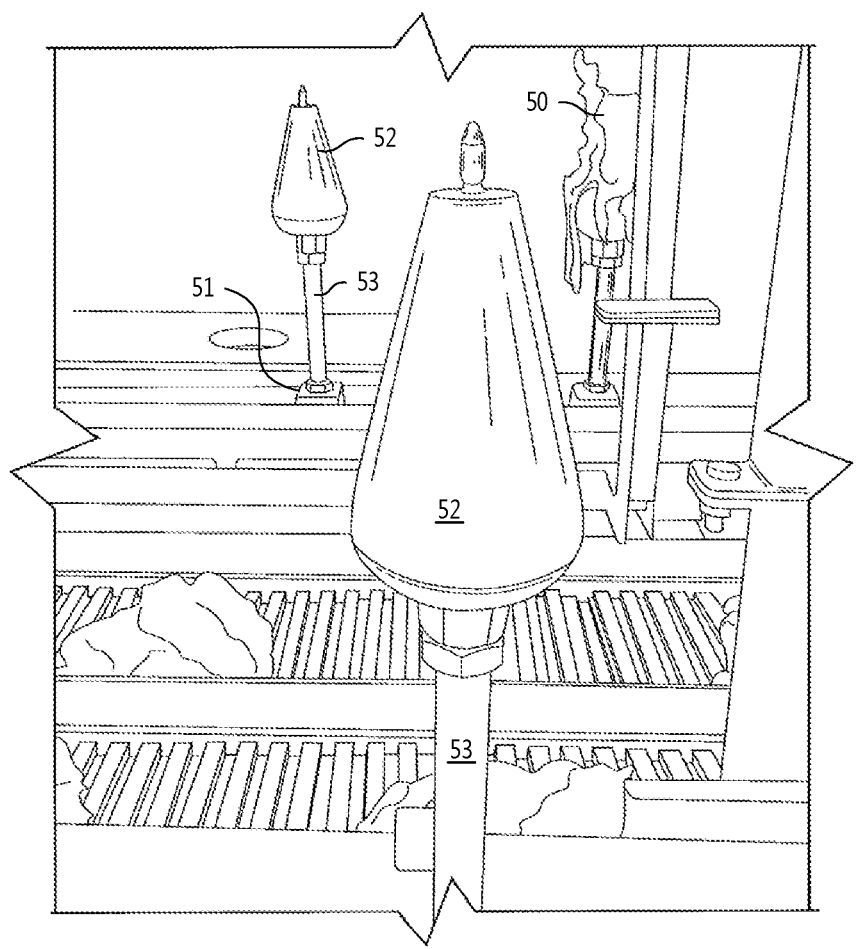
FIG. 5 is a perspective view of a portion of a carcass processing line including a cone on which a chicken carcass can be mounted for trimming and assessment of meat remaining on carcass.

FIG. 5 illustrates a perspective view of a portion of a processing line for chicken carcasses 50. The processing line includes cones 52 supported on rods 53 which are mounted in a conveyor assembly 51 which moves the cones along the processing line.

Figure 6:
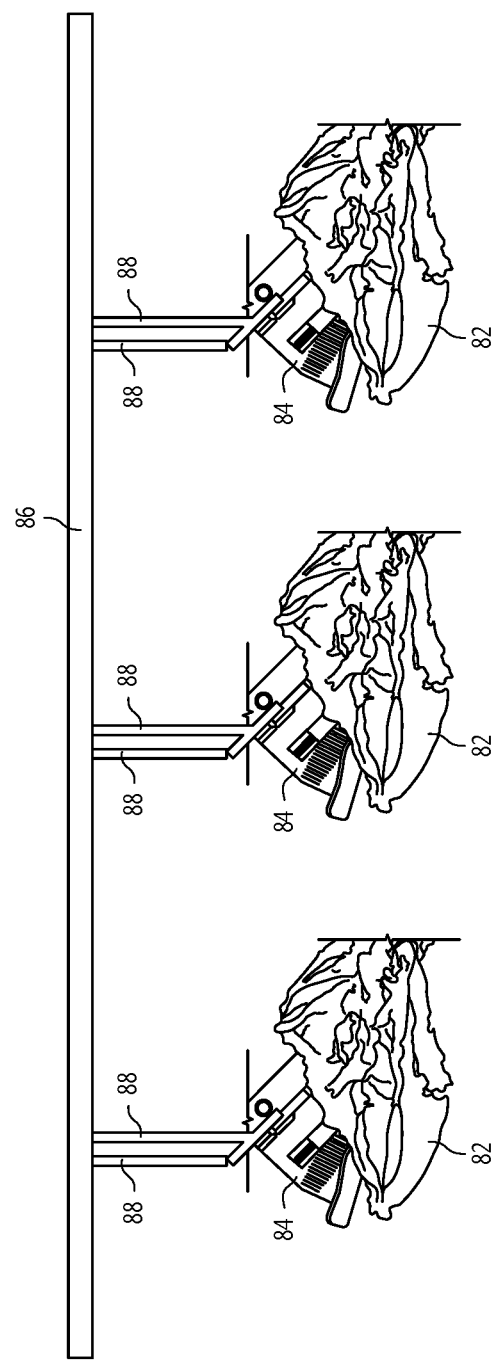
FIG. 6 is a side view of a plurality of turkey carcasses in an aligned position on a non-rotatable mount.

FIG. 6 is a schematic of a turkey processing line in which turkey carcasses 82 are mounted on non-rotatable clamps 84 (also called cones in the industry), with clamps 84 hanging from overhead moveable conveyor assembly 86 by support posts 88.

Figure 7:
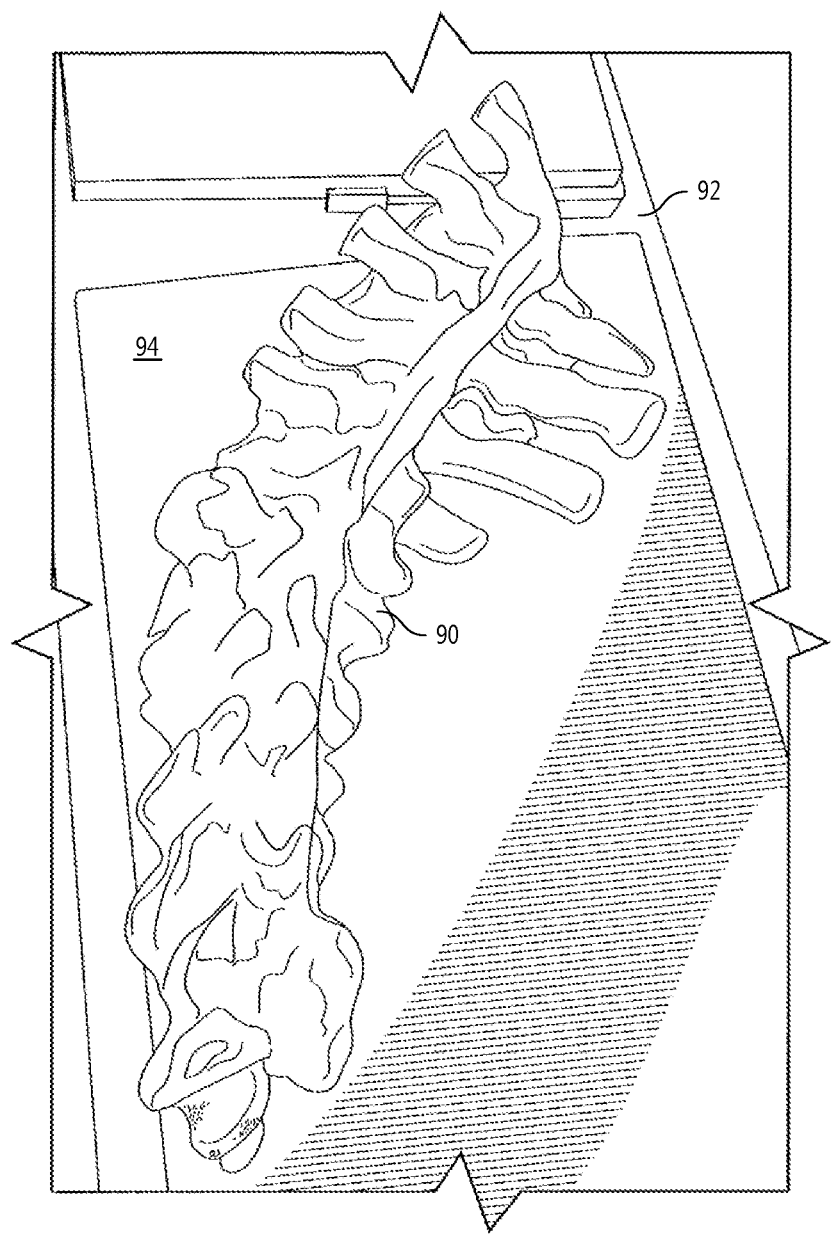
FIG. 7 is a view from above of a trimmed beef neck portion present on an endless belt conveyor.

FIG. 7 is a view from above of trimmed beef neck portion 90 present on endless belt conveyor 92. The trimmed beef neck portion 90 is passed directly underneath a camera (not illustrated) for generation of an image of the trimmed beef neck portion, which image is suitable for automated determination of amount of meat remaining on the carcass portion. The conveyor belt serves as the background for the image generation.

Figure 8A:
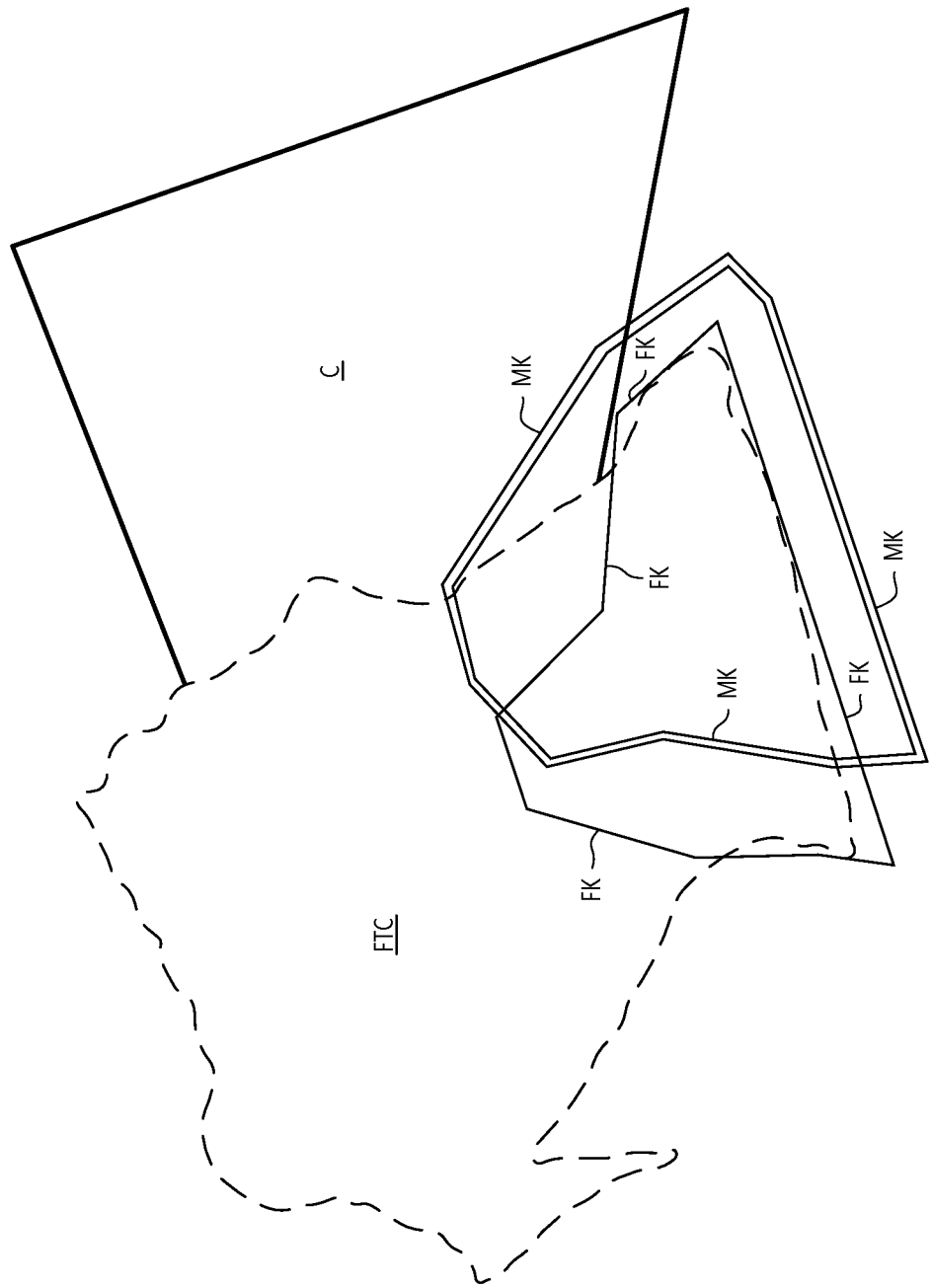
FIG. 8A is a schematic of a trimmed female carcass mounted on a cone with two super-imposed areas to be assessed, those areas being located on the keel region of the carcass.

FIG. 8A illustrates trimmed female turkey carcass (FTC, outlined in dashed line) mounted on cone (C), which is a cone as is typical on many production trimming lines. In FIG. 8A, female keel area (FK, designated by a single line perimeter) is included as an area of interest for analysis of meat remaining on carcass, as is, for purposes of comparison, male keel area (MK, identified as double line perimeter), which as an illustrated area of interest is somewhat larger in area than female keel area (FK), somewhat different in shape than female keel area (FK), and somewhat different in location relative to cone (C), relative to female keel area (FK).

Figure 8B:
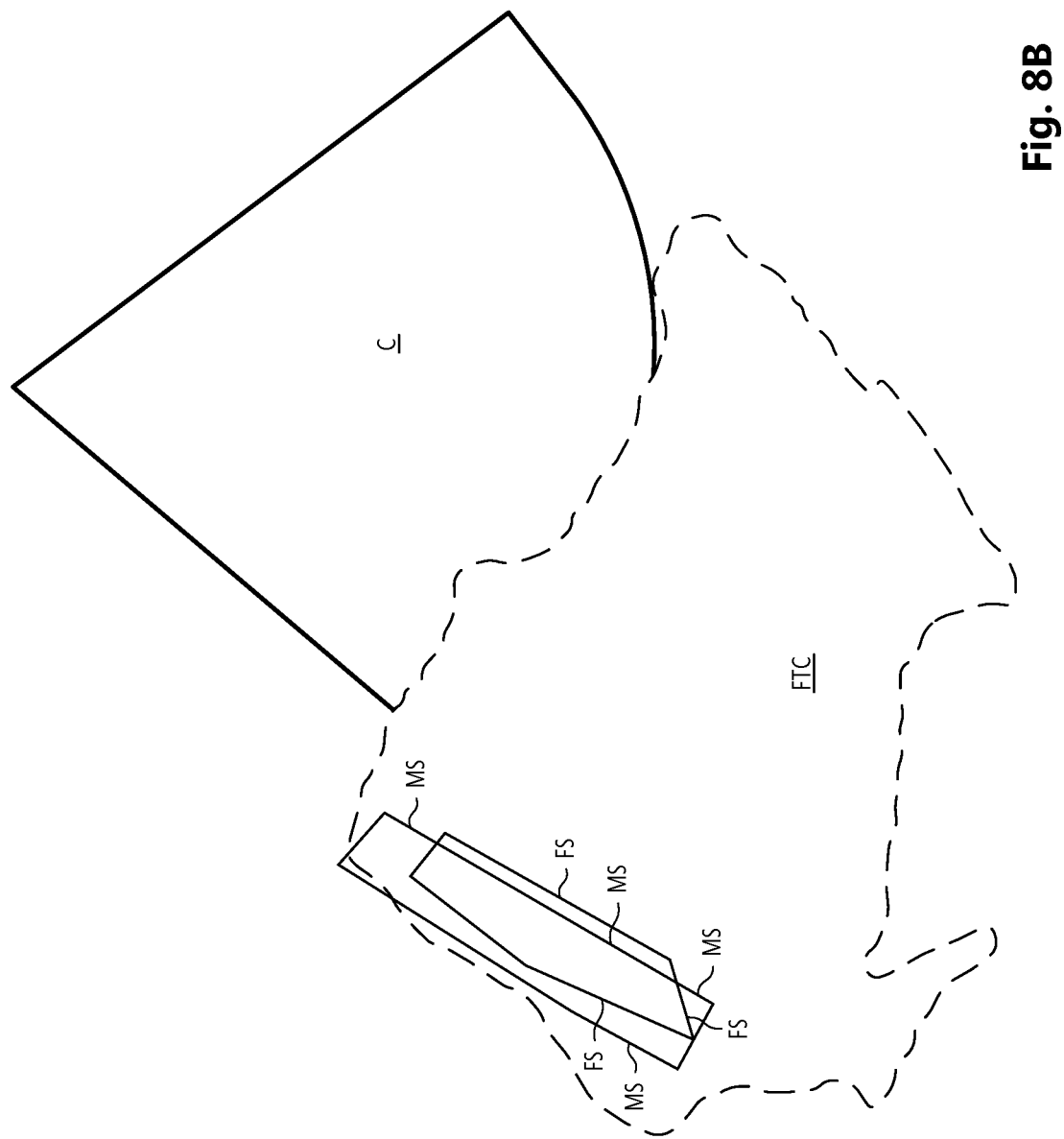
FIG. 8B is a schematic of a trimmed female carcass mounted on a cone with two super-imposed areas to be assessed, those areas being located on the scapula region of the carcass.

FIG. 8B illustrates trimmed female turkey carcass (FTC, outlined in dashed line) mounted on cone (C), as in FIG. 8A. In FIG. 8B, female scapula area (FS, designated by a single line perimeter) is included as an area of interest for analysis of meat remaining on carcass, as is, for purposes of comparison, male scapula area (MS, identified as double line perimeter), which as an illustrated area of interest is somewhat larger in area than female scapula area (FS), somewhat different in shape than female scapula area (FS), and somewhat different in location (i.e., relative to cone (C)) versus female scapula area (FS).

Figure 9:
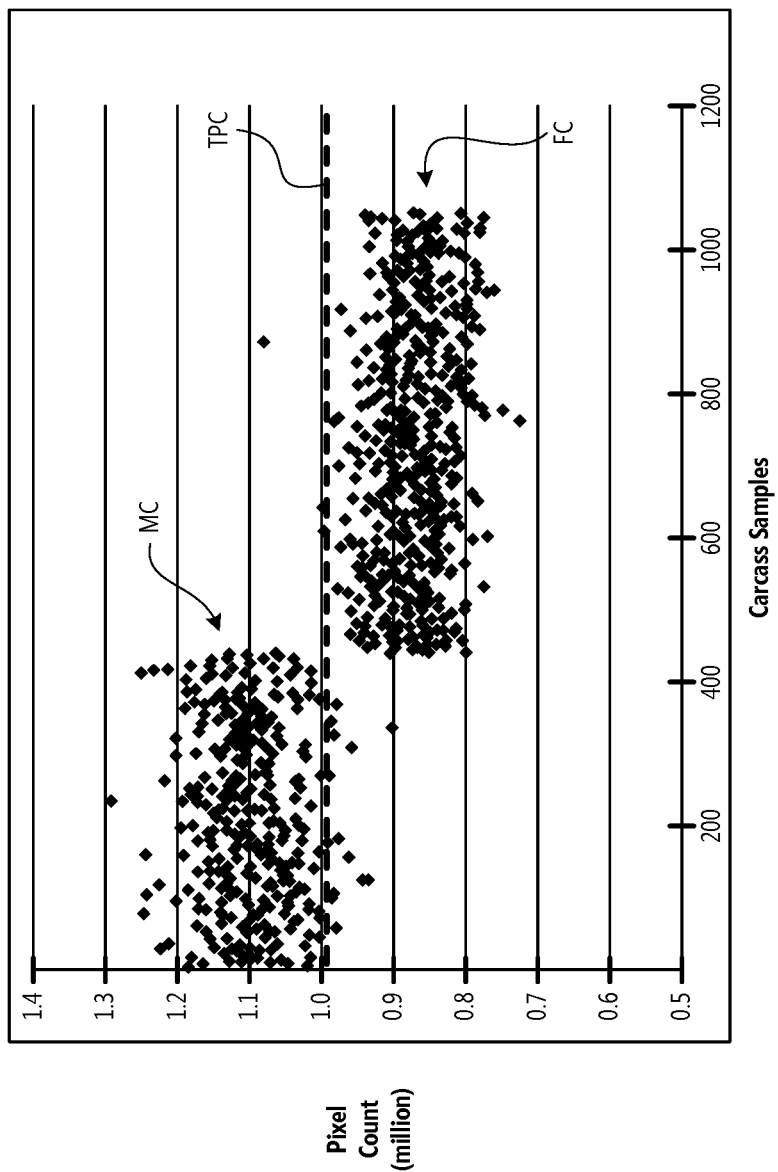
FIG. 9 is a plot of image pixel count for each of over 1100 carcasses, with a threshold value of 1 million pixels separating carcasses designated as male from carcasses designated as female.

FIG. 9 is a data plot of total pixel count of approximately 1050 trimmed turkey carcasses. About 440 carcasses were considered to be male carcasses (MC) because their image size meets or exceeds a threshold pixel count (TPC) established at 1,000,000 pixels, whereas about 610 carcasses were considered to be female carcasses (FC) because their images are below the threshold pixel count of 1,000,000 pixels. All images are taken by the same camera from the same distance. In this manner, a higher pixel count corresponds with a larger carcass.

The automated process for determining the amount of meat remaining on an animal carcass involves little or no subjectivity in the measurement process. By removing the human component, the machine vision, software-based system is capable of providing low measurement variation, and providing accurate and precise measurement of the amount of meat remaining on the animal carcass.

Although the invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

What is claimed is:

1. An automated process for determining an amount of meat remaining on an animal carcass, comprising:
   (A) generating image data with a camera, the image data being of an animal carcass after meat has been removed from at least a portion of the carcass;
   (B) transmitting the image data from the camera to a computer having machine vision software; and
   (C) processing the image data using the machine vision software to identify data related to meat remaining on the animal carcass;
   (D) determining the amount of meat remaining on the animal carcass from the data identified as relating to the meat remaining on the animal carcass; and
   comprising cross-referencing the data related to meat remaining on the animal carcass with a look-up table to determine the amount of meat remaining on the animal carcass.

2. The process of claim 1, further comprising detecting that the animal carcass in front of the camera before the image data from the animal carcass is generated by the camera.

3. The process of claim 1, wherein the processing of the image data includes one or more of determining an orientation of the animal carcass relative to the camera, identification of attributes of the carcass related to the meat remaining on the animal carcass, or measurement of attributes of the carcass related to meat remaining on the carcass.

4. The process of claim 1, wherein the processing of the image data includes locating a portion of the image data correlating with a region of the animal carcass to be assessed for the meat remaining on the carcass.

5. The process of claim 4, further comprising:
   (i) identifying the image of the animal carcass as a single blob;
   (ii) determining a number of pixels in the image of the blob; and
   (iii) at least one of:
      identifying the carcass as a male carcass if the number of pixels meets or exceeds a threshold value, or
      identifying the carcass as a female carcass if the number of pixels is less than the threshold value.

6. The process of claim 5, wherein the region of the animal carcass to be assessed differs based at least in part upon whether the carcass is a male carcass or a female carcass.

7. The process of claim 6, wherein the carcass is a poultry carcass and the region to be assessed is at least one of a keel region of the carcass or a scapula region of the carcass.

8. The process claim 1, wherein the image data is processed by at least one of:
counting a number of pixels having a color value within a defined color value range, or
counting a first number of pixels having a color value within a first color value range and a second number of pixels having a color value within a second color value range, with the first color value range not overlapping the second color value range.

9. The process of claim 1, wherein the animal carcass is a turkey carcass, wherein the image data is processed to identify image data related to turkey breast meat remaining on the turkey carcass, and wherein the image data is processed to identify image data related to turkey breast meat remaining on the turkey carcass.

10. The process of claim 1, wherein image data generated from a two-dimensional image is used to determine a three-dimensional metric corresponding with a weight of meat remaining on the animal carcass.

11. The process of claim 10, wherein the three-dimensional metric is determined from the two-dimensional image by processing color intensity data from pixels, wherein the color intensity data correlates with thickness of the meat remaining on the animal carcass.

12. An automated process for determining an amount of meat remaining on an animal carcass, comprising:
(A) generating a reference image for each of a plurality of trimmed reference carcasses and locating an area of interest in each reference image and counting the number of pixels within a value range in each area of interest for each of the plurality of trimmed reference carcasses and determining the weight of meat remaining on each of the reference carcasses;
(B) developing an equation by cross-referencing pixel count within the value range with weight of meat remaining on the carcass for each of the reference carcasses;
(C) generating an image of a trimmed carcass to be automatically assessed for amount of meat remaining thereon;
(D) locating the area of interest in the image of the trimmed carcass to be automatically assessed;
(E) counting a number of pixels in the value range in the area of interest in the trimmed carcass to be automatically assessed; and
(F) processing the pixel count in the value range in the area of interest in the image of the trimmed carcass to be automatically assessed to determine the amount of meat remaining on the trimmed carcass to be automatically assessed, using the equation that cross-references pixel count with weight of meat remaining on each of the reference carcasses.

13. The process of claim 12, further comprising:
(i) identifying the image of each carcass as a single blob;
(ii) determining a number of pixels in each blob; and
(iii) at least one of:
identifying as a male each carcass having a number of pixels meeting or exceeding a threshold value, or
identifying as a female each carcass having a number of pixels less than the threshold value.

14. The process of claim 13, wherein the area of interest in each image is based at least in part on whether the carcass is a male carcass or a female carcass.

15. The process of claim 14, wherein the carcass is a poultry carcass and the area of interest is at least one of a keel region of the carcass or a scapula region of the carcass.

16. The process of claim 12, wherein the reference images of the trimmed reference carcasses are generated solely from light reflected from the trimmed reference carcasses, and the image of the trimmed carcass to be automatically assessed is generated solely from light reflected from the trimmed carcass to be automatically assessed.

17. The process of claim 12, further comprising processing the image with a filter that carries out at least one member selected from the group consisting of (a) eliminating texture from the image, (b) performing a dilation of the image followed by erosion of the image, and (c) reducing or removing dark areas from the image, the processing of the image being carried out before the counting of the number of pixels in the area of interest.

18. The process of claim 12, wherein:
(i) the generation of the image of the trimmed carcass to be automatically assessed for amount of meat remaining thereon, and
(ii) the locating of the area of interest in the image of the trimmed carcass to be automatically assessed, and
(iii) the counting of the number of pixels in the value range in the area of interest in the trimmed carcass to be automatically assessed, and
(iv) the processing of the pixel count in the value range in the area of interest in the image of the trimmed carcass to be automatically assessed to determine the amount of meat remaining on the trimmed carcass to be automatically assessed, using the equation that cross-references pixel count within the value range with weight of meat remaining on each of the reference carcasses, are all carried out in a carcass processing line with the trimmed carcass to be automatically assessed being one in a series of trimmed carcasses to be automatically assessed, said carcasses proceeding down the carcass processing line without being removed from the processing line, as process steps (i), (ii), (iii), and (iv) are being carried out.

19. The process claim 12, wherein:
(i) the generating of the image of the trimmed carcass to be automatically assessed includes generating of a first image of a left side of the trimmed carcass and generating of a second image of a right side of the trimmed carcass;
(ii) the locating of the area of interest in the image of the trimmed carcass to be automatically assessed includes locating a first area of interest in the left side of the trimmed carcass to be automatically assessed, and locating a second area of interest in the right side of the trimmed carcass to be automatically assessed;
(iii) the counting of the number of pixels in the value range in the area of interest in the trimmed carcass to be automatically assessed includes counting the number of pixels in the first area of interest in the image of the left side of the trimmed carcass to be automatically assessed, and counting the number of pixels in the second area of interest in the image of the right side of the trimmed carcass to be automatically assessed; and
(iv) the processing of the pixel count in the value range in the area of interest in the image of the trimmed carcass to be automatically assessed to determine the amount of meat remaining on the trimmed carcass to be automatically assessed, using the equation that cross-references pixel count within the value range with weight of meat remaining on each of the reference carcasses, is conducted for both the left side of the trimmed carcass and the right side of the trimmed carcass.

20. The process of claim 12, wherein the process is carried out on a chicken processing line comprising a plurality of the trimmed chicken carcasses to be automatically assessed for amount of meat remaining on the carcass, the process further comprising:

forwarding the plurality of trimmed chicken carcasses to be automatically assessed, each trimmed chicken carcass being mounted on a cone support, each of the trimmed chicken carcasses to be automatically assessed comprising a protruding breastbone, and passing each mounted trimmed chicken carcass to be automatically assessed through a carcass orientation device comprising a pair of inwardly biased carcass contact members that allow passage of the mounted, trimmed chicken carcasses therebetween in a manner so that at least 95 percent of the trimmed chicken carcasses are placed in a breastbone-upstream orientation after passing through the orientation device;

generating a first image of a left side of the trimmed carcass with a first camera mounted on a first side of the chicken processing line, and generating a second image of a right side of the trimmed carcass with a second camera mounted on a second side of the chicken line;

locating a first area of interest in the first image of the left side of each of the trimmed carcasses to be automatically assessed, and locating a second area of interest in the second image of the right side of each of the trimmed carcasses to be automatically assessed;

counting the number of pixels in the value range in the first area of interest of the first image of the left side of each of the trimmed carcasses to be automatically assessed, and counting the number of pixels in the value range in the second area of interest of the second image of the right side of each of the trimmed carcasses to be automatically assessed; and processing the pixel count in the value range in the first area of interest in the first image of the left side of each of the trimmed carcasses to be automatically assessed to determine an amount of meat remaining on the left side of each of the trimmed carcasses to be automatically assessed, and processing the pixel count in the value range in the second area of interest in the second image of the right side of each of the trimmed carcasses to be automatically assessed to determine an amount of meat remaining on the right side of the trimmed carcass to be automatically assessed.

21. The process of claim 12, wherein the trimmed carcass is positioned on a conveyor and the image is generated by a camera positioned directly above the conveyor, and wherein the trimmed carcass is selected from the group consisting of trimmed neck carcass and trimmed pelvis carcass.

* * * * *